Figure 1:
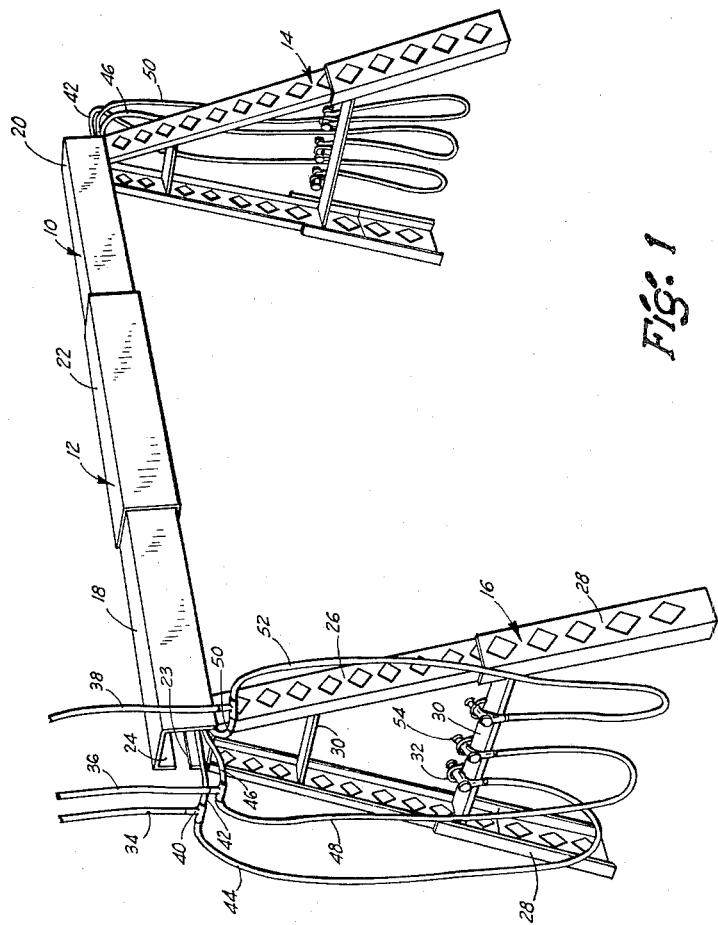

Dec. 20, 1960   M. GLAZER ET AL   2,965,305
CAR WASHING RACK
Filed Sept. 15, 1958

INVENTOR.
Morris Glazer
BY   Ted Padek

ATTORNEY

United States Patent Office 2,965,305
Patented Dec. 20, 1960

2,965,305

CAR WASHING RACK

Morris Glazer and Ted Padek, Tulsa, Okla., assignors to Spray Away Wash Systems, Inc., Tulsa, Okla., a corporation of Oklahoma Filed Sept. 15, 1958, Ser. No. 761,190

1 Claim. (Cl. 239—195)

This invention relates to improvements in car washing rack apparatus, and more particularly, but not by way of limitation, to an apparatus for facilitating the washing of cars, and the like, with a liquid cleansing composition.

The widespread innovation of so-called quick car washing businesses has somewhat reduced the car washing operation of the usual service station in that the quick car washing businesses, as a general rule, are able to provide a much more rapid car washing service. In an effort to provide a more facile and competitive car washing service for the service stations, there has recently been developed a chemical agent or solution which may be sprayed onto the body of an automobile for quickly and easily removing the dirt therefrom. It has been found that with the use of this chemical solution, service stations are able to offer a very competitive quick car washing operation. Normally, the chemical solution is contained within a tank or vessel mounted on wheels, or the like, which may be pulled around the service station area adjacent the car being washed. However, this is a somewhat awkward and cumbersome method of operation for the service station attendant who normally washes the automobile.

The present invention contemplates a novel car washing rack apparatus particularly designed and constructed for utilization with a chemical car cleansing solution in order to facilitate the utilization thereof. The novel apparatus comprises a frame structure adapted to straddle a car in a manner whereby all portions thereof may be readily reached by suitable hose members. Thus, the attendant may readily cleanse the entire car without the necessity of dragging or pulling heavy equipment around as he is working. The novel structure greatly facilitates the washing of the car, and provides a substantially clean operation for the attendant doing the washing service. The novel apparatus is simple and efficient in operation and economical and durable in construction.

It is an important object of this invention to provide an apparatus for facilitating the washing of an automobile, and the like.

It is another object of this invention to provide a novel car washing apparatus particularly designed and constructed to facilitate the utilization of liquid chemical car cleansing solutions.

Another object of this invention is to provide a novel car washing apparatus whereby all portions of the car body may be readily reached for a rapid and thorough washing thereof.

Still another object of this invention is to provide a car washing apparatus wherein the car washing service may be accomplished with a minimum of discomfort to the service station attendant.

It is a further object of this invention to provide a car washing apparatus which is simple and efficient in operation and economical and durable in construction.

Other objects and advantages of the invention will be evident from the following detailed description, read in conjunction with the accompaying drawings, which illustrate our invention.

In the drawing:

Figure 1 is a perspective view of a car washing apparatus embodying the invention.

Referring to the drawings in detail, reference character 10 refers in general to a car or vehicle washing rack comprising a horizontally disposed telescopic cross bar member 12 supported on a pair of horizontally spaced A-frame members 14 and 16. The bar member 12 is preferably constructed from steel or aluminum, but not limited thereto, and is provided with a pair of substantially identical end members 18 and 20 telescopically disposed within a central member 22 in any well known manner (not shown). It will be apparent that suitable stop members (not shown) may be provided to preclude an accidental complete withdrawal of the end members 18 and 20 from the central member 22.

The members 18 and 20 are substantially identical, as hereinbefore set forth. Thus, only the member 18 will we described. The member 18 is preferably made from a sheet of steel which is shaped in any well known manner (not shown) to provide a substantially square shaped tubular member, as clearly shown in the drawings. A longitudinally extending opening 23 is provided in one vertical face 24 of the member 18 and extends throughout the length thereof. The central member 22 is of a similar configuration as the members 18 and 20. It will thus be apparent that longitudinal opening 23 will provide an opening extending throughout the length of the bar member 12 for a purpose as will be hereinafter set forth.

The A-frame members 14 and 16 are identical and may be constructed from any suitable type material, such as perforated steel channel, or the like. The frame members 14 and 16 preferably comprise an A-shaped upper leg portion 26 having lower leg members 28 telescopically disposed therein whereby the vertical height of the frame members may be adjusted as desired. A plurality of cross bar members 30 are provided for the frame members 14 and 16 to provide a rigidity and stability therefor. A plurality of loop members 32, or the like, may be spaced on the cross bar members 30 for a purpose as will be hereinafter set forth.

A plurality of hose or conduit members 34, 36 and 38 may be supported in the proximity of the rack member 10 above the A-frame 16 in any well known manner, such as by hook members (not shown) secured to a ceiling or the like (not shown), but not limited thereto. The hose member 34 may extend to a suitable source of water (not shown), while the hose member 36 preferably extends to a source of the chemical cleansing solution (not shown). The hose member 38 may extend into communication with a compressed air source (not shown). Each of the hose members 34, 36 and 38 are provided with a suitable hose connection member 40, such as a T-fitting, or the like, to receive a pair of hose members thereon. For example, the hose 34 is in communication with a hose 42 and a second hose 44. The hose member 36 is in communication with a pair of hoses 46 and 48, and the hose member 38 is in communication with a pair of hoses 50 and 52. The hoses 42, 46 and 50 are disposed within the bar member 12 and extend therethrough to the A-frame member 14, as shown in the drawings. The hose members 44, 48 and 52, however, extend downwardly to the A-frame 16. It will be apparent that the water, chemical solution and compressed air may thus be communicated to the area surrounding both of the A-frame members 14 and 16. Each of the hoses 42, 44, 46, 48, 50 and 52 is provided with suitable nozzles 54 at the extreme ends thereof for facilitating the use of the hoses, as is well known. The nozzles 54 may be hooked or otherwise disposed in the loop members 32 as shown in the drawings for storage when the hoses or rack 10 are not in use. It will be further apparent that any number of hoses may be utilized with the rack 10, and is not limited to three hoses as shown herein.

Operation

When it is desired to wash a vehicle (not shown), the rack 10 may be disposed thereover in such a manner as to straddle the vehicle. The height of the rack 10 may be readily adjusted by positioning the telescopic A-frames as desired. Similarly, the length of the bar member 12 may be adjusted as desired by manipulation of the telescopic members 18, 20 and 22. The hose members 42, 46 and 50 may be readily disposed in the bar 12 by inserting them through the opening 23. With the rack 10 thus arranged, it will be apparent that all portions of the outer body of the vehicle may be readily reached by the hoses.

In the washing of the vehicle, it is desirable to spray the vehicle with the chemical washing solution for a rapid cleansing thereof. Thus, the hose members 46 and 48 may be utilized for spraying of the chemical solution onto the vehicle. It will be apparent that the hose member 46 may be utilized for spraying substantially one-half of the vehicle, while the hose 48 may be utilized for spraying the remaining portion thereof. The chemical solution is then preferably washed or rinsed away by the use of water. Thus, the hose members 42 and 44 may be utilized for rinsing of the vehicle.

It is highly desirable to clean the inside of the automobile during the washing operation. Of course, water is frequently used in this operation, and it will be apparent that the water is always readily attainable since the hoses 42 and 44 are readily accessible from all portions of the vehicle. In addition, the compressed air from the hoses 50 and 52 may be utilized for facilitating the cleaning of the inside of the car, as is well known.

When the rack 10 is not in use, the nozzles 54 may be hooked through the members 32 for retaining the hoses in a neat and orderly manner on the frame members 14 and 16, as shown in the drawings. The rack 10 may be stored in the assembly condition, and normally will not interfere with other operations of a service station.

From the foregoing, it will be apparent that the present invention provides a novel car washing rack wherein a vehicle may be quickly washed at the usual service station. The chemical cleansing solution and the rinsing water are maintained readily at hand for facilitating the labors of the service station attendant. In addition, the car washing operation may be performed with a minimum of discomfort to the attendant. The washing rack is simple and efficient in operation and economical and durable in construction.

Changes may be made in the combination and arrangement of parts as heretofore set forth in the specification and shown in the drawing, it being understood that any modification in the precise embodiment of the invention may be made within the scope of the following claim without departing from the spirit of the invention.

We claim:

A vehicle washing rack comprising a pair of horizontally spaced telescopic A-frame members for receiving the vehicle therebetween, a cross bar member supported on the A-frame and vertically disposed thereon for spanning the vehicle above the top thereof, said cross bar member comprising a plurality of telescopically arranged elongated hollow members, said hollow members provided with a longitudinally extending opening therein to provide access to the interior thereof, a plurality of hose members disposed in the hollow members and extending longitudinally therethrough, one end of each of said hose members disposed in the proximity of one of the A-frame members, the opposite end of each of said hose members oppositely disposed from said A-frame member and in communication with a source of cleansing agents, additional hose members extending from the source of cleansing agents to the proximity of the second of the A-frame members, said arrangement of all of said hoses providing for accessibility of the cleansing agents to all portions of the vehicle, a nozzle provided for each of the hose members for spraying a cleansing agent onto the vehicle, and support members provided on each A-frame for receiving the nozzles during storage thereof when not in use for washing of the vehicle, said cleansing agents comprising a liquid detergent, water and compressed air.

References Cited in the file of this patent

UNITED STATES PATENTS

| | | |
|---|---|---|
| 501,348 | Jaquiess | July 11, 1893 |
| 812,344 | Howser | Feb. 13, 1906 |
| 1,103,699 | South | July 14, 1914 |
| 2,325,592 | Degler | Aug. 3, 1943 |
| 2,699,792 | Fisher | Jan. 18, 1955 |